(12) United States Patent
Kudoh (10) Patent No.: US 7,936,985 B2
(45) Date of Patent: May 3, 2011

(54) LENS BARREL AND IMAGE PICKUP APPARATUS

(75) Inventor: Tomoyuki Kudoh, Tokyo (JP)

(73) Assignee: Canon Kabushiki Kaisha (JP)

( * ) Notice: Subject to any disclaimer, the term of this patent is extended or adjusted under 35 U.S.C. 154(b) by 64 days.

(21) Appl. No.: 12/401,615

(22) Filed: Mar. 10, 2009

(65) Prior Publication Data

US 2009/0232484 A1    Sep. 17, 2009

(30) Foreign Application Priority Data

Mar. 11, 2008    (JP) .................... 2008-061148

(51) Int. Cl.
*G03B 13/18*    (2006.01)
(52) U.S. Cl. .................... 396/89; 359/825
(58) Field of Classification Search .......... 396/72, 396/79, 89, 102, 131; 359/819, 821–823, 359/825–826
See application file for complete search history.

(56) References Cited

U.S. PATENT DOCUMENTS

| | | | |
|---|---|---|---|
| 6,606,206 | B2 | 8/2003 | Takeshita et al. |
| 6,934,096 | B1 | 8/2005 | Takeshita et al. |
| 7,133,216 | B2 | 11/2006 | Takeshita et al. |
| 2002/0044363 | A1 | 4/2002 | Takeshita et al. |
| 2003/0081948 | A1* | 5/2003 | Nomura et al. .............. 396/72 |
| 2005/0243444 | A1 | 11/2005 | Takeshita et al. |
| 2007/0195437 | A1 | 8/2007 | Yasuda |

FOREIGN PATENT DOCUMENTS

| | | |
|---|---|---|
| JP | 2000-66081 A | 3/2000 |
| JP | 2001-324663 A | 11/2001 |
| JP | 2003-21776 A | 1/2003 |

OTHER PUBLICATIONS

Partial European Search Report dated Apr. 27, 2009, issued in corresponding European Application No. 09154765.3-2217.
Notification of First Office Action issued in corresponding Chinese Patent Application No. 200910118769.2 dated Jul. 14, 2010.

* cited by examiner

*Primary Examiner* — Clayton E Laballe
*Assistant Examiner* — Autumn Parker
(74) *Attorney, Agent, or Firm* — Rossi, Kimms & McDowell LLP (57) ABSTRACT

A lens barrel having an increased strength against external impact. The lens barrel is configured to move in an optical axis direction. A photographic lens unit moves in the optical axis direction. A cylindrical unit is engaged with the photographic lens unit, and has an outer periphery formed thereon with a first cam groove followed by the photographic lens unit. The cylindrical unit performs rotation to thereby move the photographic lens unit in the optical axis direction. A rectilinear motion-causing restriction member is engaged with the cylindrical unit to restrict motion of the photographic lens unit to rectilinear motion. A second cylindrical unit is disposed around the photographic lens unit and the cylindrical unit to guide the photographic lens unit for rectilinear motion. A second rectilinear motion-causing restriction member restricts motion of the rectilinear motion-causing restriction member and the second cylindrical unit in a direction of rotation.

7 Claims, 12 Drawing Sheets

LENS BARREL AND IMAGE PICKUP APPARATUS

BACKGROUND OF THE INVENTION

1. Field of the Invention

The present invention relates to a lens barrel and an image pickup apparatus provided with the lens barrel.

2. Description of the Related Art

Conventionally, film cameras using a silver salt film have been in widespread use, but recently, digital cameras which are capable of capturing an image into a memory without using a film have sprung into wide use. These digital cameras include one provided with a zoom mechanism for moving a plurality of optical lenses along the optical axis to thereby change the photographing magnification.

Japanese Patent Laid-Open Publication No. 2001-324663 discloses an example of the construction of a zoom lens barrel. In this zoom lens barrel, a plurality of lens holding parts holding a plurality of lens are moved along the optical axis by a cam ring, and at the same time the motion of the lens holding parts in a direction of rotation is restricted by a rotation restricting part. With this construction, the optical lenses can be moved to a designated position.

In recent years, a rapid progress has been made toward a higher photographing magnification, and with this progress, the number of lens groups and the length of a lens barrel in its fully extended state tend to be increased, i.e. a zoom lens barrel tends to be increased in size. On the other hand, there is a strong demand for reduction of the thickness of a camera, and hence it is required to minimize the size of the zoom lens barrel in its retracted state. For the reduction of the thickness of a camera, it is envisaged to reduce the size of each of barrels of a zoom lens barrel in the optical axis direction and connect the barrels each having a reduced size such that the zoom lens barrel has a multi-stage construction with an increased number of barrels. For such reduction of camera thickness, there have already been proposed various methods.

Japanese Patent Laid-Open Publication No. 2000-66081 shows an example of a lens barrel using a prism-shaped metal rectilinear slide key for size reduction. With this construction, barrels of the lens barrel can be partially held by the metal key which is reduced in thickness such that they can be moved rectilinearly. A lens barrel of this type is more excellent in space efficiency than a conventional lens barrel held by a plastic molded barrel for rectilinear motion, and therefore it is suitable for size reduction.

Further, Japanese Patent Laid-Open Publication No. 2003-21776 shows an example of a lens barrel having cam barrels connected in multiple stages.

In this case as well, barrels of the lens barrel are partially held for rectilinear motion by a thin metal keys and therefore a lens barrel of this type is also suitable for size reduction.

In the case of the lens barrels disclosed in the above-mentioned Japanese Patent Laid-Open Publication No. 2000-66081 and Japanese Patent Laid-Open Publication No. 2003-21776, even an impact applied thereto e.g. due to a drop of the camera causes no problem insofar as a rotational force is not applied to the rectilinearly sliding metal key. However, when a rotational force is applied, the rectilinear slide key receives a lateral load. Therefore, if the rotational force is large, the rectilinear slide key can fall, resulting a trouble in the operation of the lens barrel.

In recent years, the camera size has been progressively reduced, and with the advancement of the size reduction, how to efficiently absorb an external impact has become a problem to be worked on.

Thus, it is required to provide a lens barrel having a construction excellent in precision and at the same time resistant to external impact.

SUMMARY OF THE INVENTION

The present invention provides a lens barrel having an increased strength against external impact and an image pickup apparatus provided with the same.

In a first aspect of the present invention, there is provided a lens barrel that is movable in an optical axis direction, comprising a lens unit configured to be movable in the optical axis direction, a cylindrical unit disposed in an inner periphery of the lens unit and configured to have a cam portion formed on an outer periphery thereof for causing the lens unit to follow the cam portion, the cylindrical unit being configured to perform rotation to thereby move the lens unit in the optical axis direction, a rectilinear motion-causing restriction member disposed in an inner periphery of the cylindrical unit and configured to restrict motion of the lens unit to rectilinear motion, a second cylindrical unit disposed around the lens unit and the cylindrical unit, and configured to guide the lens unit for the rectilinear motion, and a second rectilinear motion-causing restriction member configured to restrict motion of the rectilinear motion-causing restriction member and the second cylindrical unit in a direction of rotation.

With the construction of the lens barrel according to the first aspect of the present invention, since an impact force applied to the lens unit is received not only by the rectilinear motion-causing restriction member disposed on the inner periphery of the lens unit, but also by the second cylindrical unit disposed around the lens unit, it is possible to increase the strength of the lens barrel against external impact. Further, it is possible to increase a margin of strength against destruction due to impact.

In a second aspect of the present invention, there is provided an image pickup apparatus comprising a lens barrel that is movable in an optical axis direction, the lens barrel comprising a lens unit configured to be movable in the optical axis direction, a cylindrical unit disposed in an inner periphery of the lens unit and configured to have a cam portion formed on an outer periphery thereof for causing the lens unit to follow the cam portion, the cylindrical unit being configured to perform rotation to thereby move the lens unit in the optical axis direction, a rectilinear motion-causing restriction member disposed in an inner periphery of the cylindrical unit and configured to restrict motion of the lens unit to a rectilinear motion, a second cylindrical unit disposed around the lens unit and the cylindrical unit, and configured to guide the lens unit for the rectilinear motion, and a second rectilinear motion-causing restriction member configured to restrict motion of the rectilinear motion-causing restriction member and the second cylindrical unit in a direction of rotation.

In a third aspect of the present invention, there is provided a lens barrel that is movable in an optical axis direction, comprising a lens unit configured to be movable in the optical axis direction, a rectilinear motion-causing restriction member configured to restrict motion of the lens unit to rectilinear motion, and a second rectilinear motion-causing restriction member configured to restrict motion of the rectilinear motion-causing restriction member to rectilinear motion, wherein the second rectilinear motion-causing restriction member comprises an annular portion, a rectilinear motion-causing restriction portion protruding from the annular portion in the optical axis direction and engaged with the rectilinear motion-causing restriction member to thereby restrict the motion of the rectilinear motion-causing restriction member to the rectilinear motion, and a deformation-preventive holding portion formed on the annular portion and configured to hold the rectilinear motion-causing restriction portion, and wherein the deformation-preventive holding portion also serves as a holding portion that is rotatably coupled to a third cylindrical unit configured to perform rotation to move the lens unit in the optical axis direction.

In a fourth aspect of the present invention, there is provided a lens barrel that is movable in an optical axis direction, comprising a lens unit configured to be movable in the optical axis direction, a rectilinear motion-causing restriction member configured to restrict motion of the lens unit to rectilinear motion, and a second rectilinear motion-causing restriction member configured to restrict motion of the rectilinear motion-causing restriction member to rectilinear motion, wherein the second rectilinear motion-causing restriction member comprises an annular portion, a rectilinear motion-causing restriction portion protruding from the annular portion in the optical axis direction and engaged with the rectilinear motion-causing restriction member to thereby restrict the motion of the rectilinear motion-causing restriction member to the rectilinear motion, and deformation-preventive holding portions formed on the annular portion on respective opposite sides of the rectilinear motion-causing restriction portion in a tangent direction to thereby hold the rectilinear motion-causing restriction portion.

In a fifth aspect of the present invention, there is provided a lens barrel that is movable in an optical axis direction, comprising a lens unit configured to be movable in the optical axis direction, a rectilinear motion-causing restriction member configured to restrict motion of the lens unit to rectilinear motion, and a second rectilinear motion-causing restriction member configured to restrict motion of the rectilinear motion-causing restriction member to rectilinear motion, wherein the second rectilinear motion-causing restriction member comprises an annular portion, a plurality of rectilinear motion-causing restriction portions protruding from the annular portion in the optical axis direction and engaged with the rectilinear motion-causing restriction member to thereby restrict the motion of the rectilinear motion-causing restriction member to the rectilinear motion, and deformation-preventive holding portions formed on the annular portion and configured to hold the rectilinear motion-causing restriction portions disposed on respective opposite sides of each of the deformation-preventive holding portions.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof. An image pickup apparatus according to the present embodiment is applied to a digital camera provided with a photographic lens barrel having a collapsible zoom mechanism which is capable of changing photographing magnification as desired.

Figure 1:
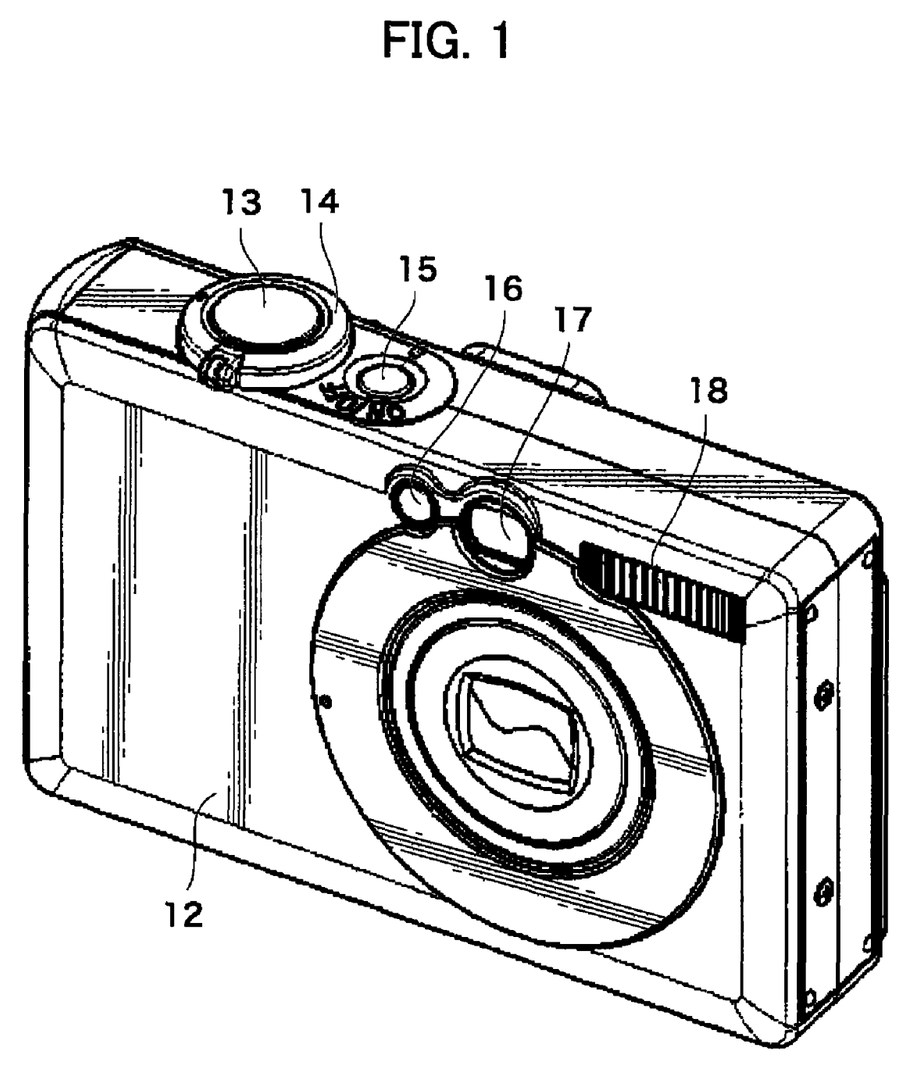
FIG. 1 is a perspective view of the appearance of a digital camera in a power-off state.

FIG. 1 is a perspective view of the appearance of a digital camera 12 in a power-off state.

Figure 2:
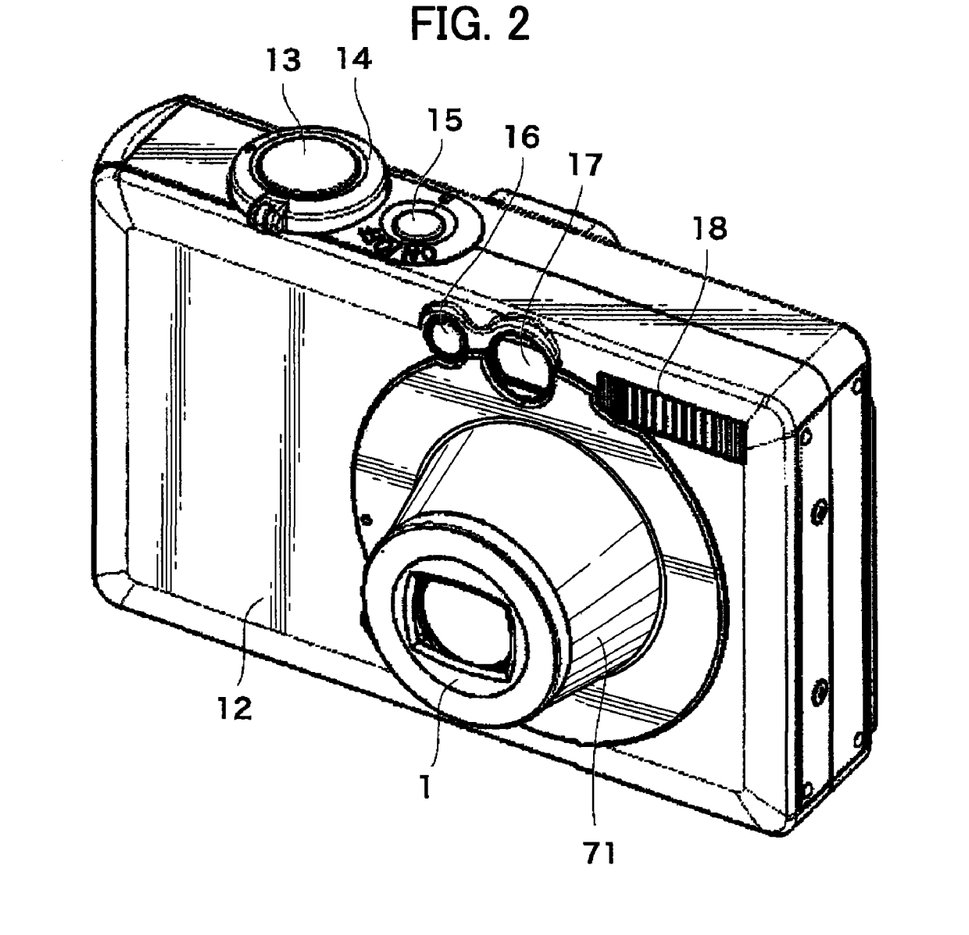
FIG. 2 is a perspective view of the appearance of the digital camera in a power-on state.
Figure 3:
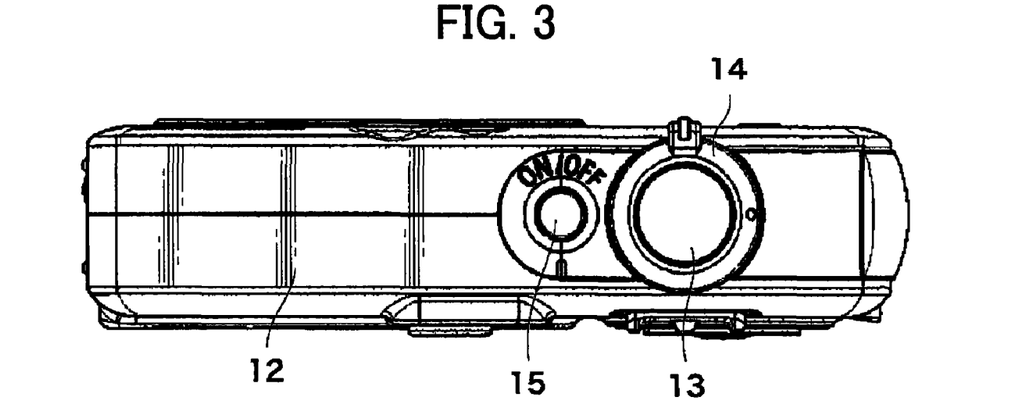
FIG. 3 is a top view of the digital camera.
Figure 4:
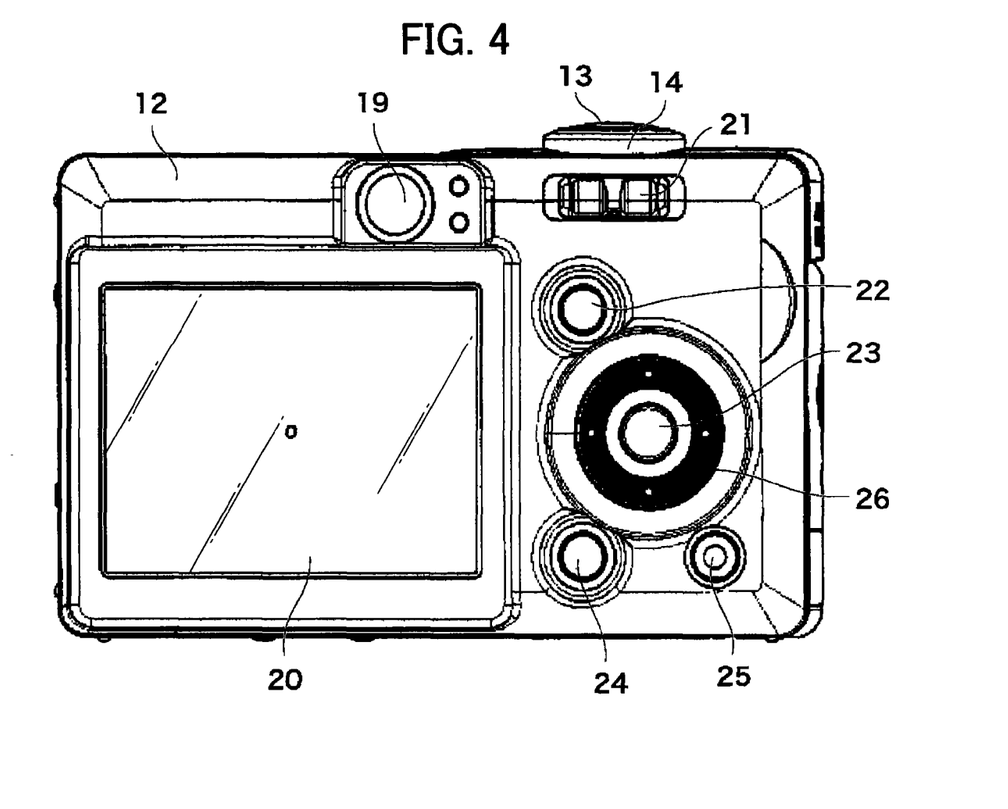
FIG. 4 is a rear view of the digital camera.
Figure 5:
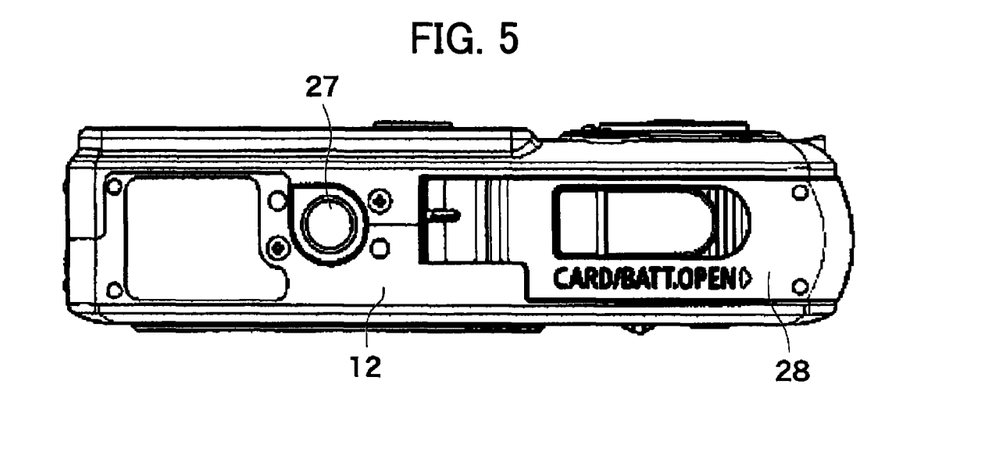
FIG. 5 is a bottom view of the digital camera.

FIG. 2 is a perspective view of the appearance of the digital camera 12 in a power-on state. FIG. 3 is a top view the digital camera 12. FIG. 4 is a rear view of the digital camera 12. FIG. 5 is a bottom view of the digital camera 12.

On the front surface of the digital camera 12, there are arranged a viewfinder 17 for determining a composition of an object, an auxiliary light source 16 for assisting a light source in photometry and ranging, a strobe 18, and a photographic lens barrel 71.

On the top surface of the digital camera 12, there are arranged a release button 13, a power supply switching button 15, and a zoom switch 14. On the bottom surface of the digital camera 12, there are arranged a tripod mounting part 27 and a card battery cover 28. A memory card drive 42, referred to hereinafter, and a battery inserting part (not shown) are disposed within the card battery cover 28.

Further, on the rear surface of the digital camera 12, there are arranged operation buttons 21, 22, 23, 24, 25, and 26 for switching of various functions, a display 20 implemented by an LCD, and a finder eyepiece 19. When one of the operation buttons 21, 22, 23, 24, 25, and 26 is pressed, an associated one of operation modes of the digital camera 12, such as a shooting mode, a reproduction mode, and a moving image shooting mode, is selected. The display 20 displays image data stored in a memory 40 or image data read from a memory card on a screen. Further, when the reproduction mode is selected, the display 20 reduces the image sizes of a plurality of picked-up image data and displays the reduced image data on the screen.

Figure 6:
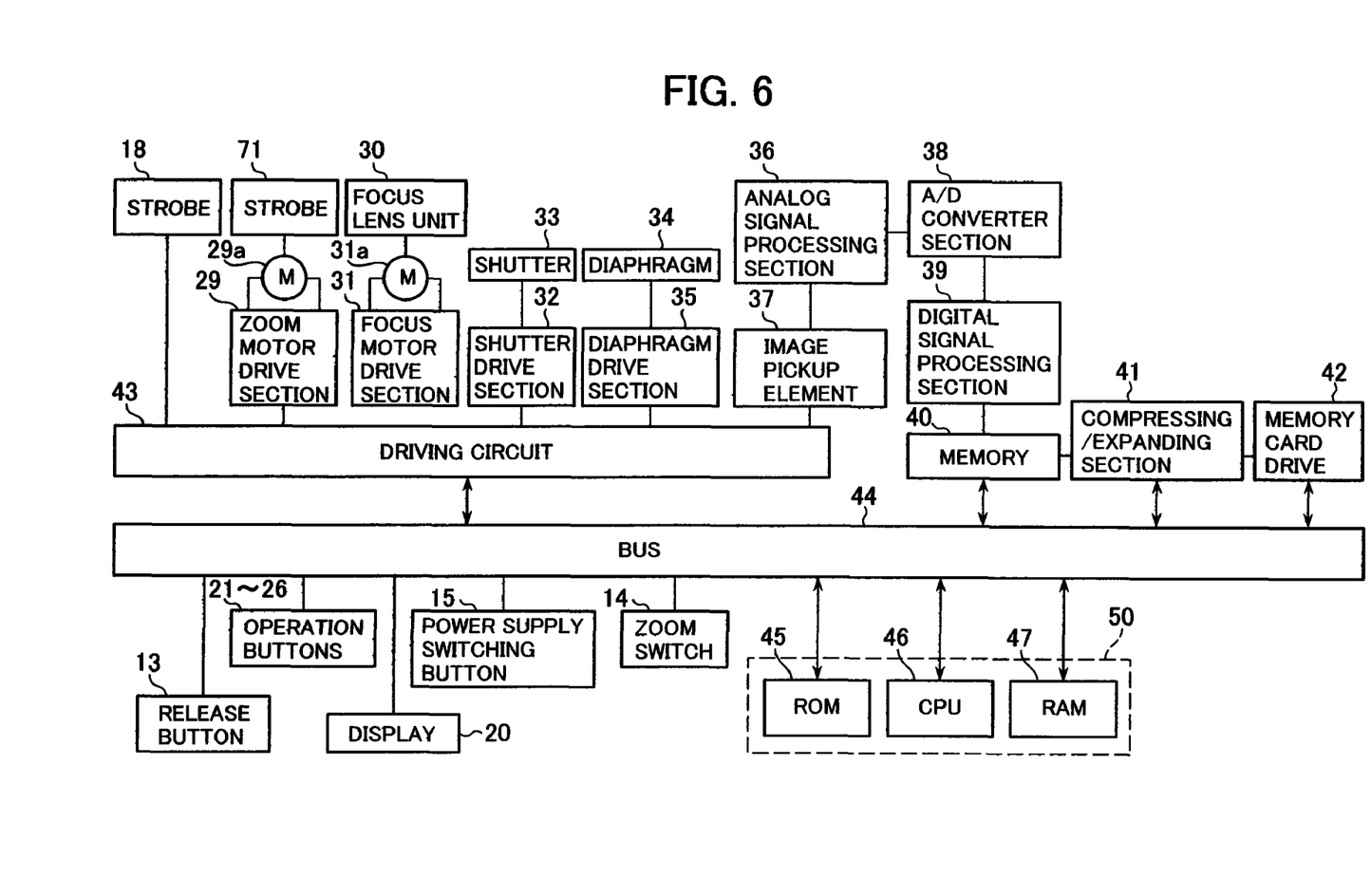
FIG. 6 is a block diagram of a controller of the digital camera and a peripheral circuit of the controller.

FIG. 6 is a block diagram of a controller of the digital camera 12 and a peripheral circuit of the controller. The controller 50 is basically comprised of a CPU 46, a ROM 45, and a RAM 47. The controller 50 is connected to the release button 13, the operation button 21 to 26, the display 20, the memory 40, the memory card drive 42, and other component elements, via a bus 44.

Further, a driving circuit 43 connected to the controller 50 via the bus 44 is connected to a zoom motor drive section 29, a focus motor drive section 31, a shutter drive section 32, a diaphragm drive section 35, an image pickup element 37 implemented by a CCD or a CMOS, and the strobe 18. The zoom motor drive section 29 drives a barrel drive motor 29a. The focus motor drive section 31 drives a focus motor 31a. These sections are drivingly controlled by signals from the controller 50. The ROM 45 stores control programs for controlling the above-mentioned various component elements. The RAM 47 stores data required for the control programs.

In the digital camera 12 constructed as above, when a user turns on its power supply by operating the power supply switching button 15, the CPU 46 reads out a necessary control program from the ROM 45 and starts an initial operation. More specifically, the controller 50 moves the photographic lens barrel 71 to a predetermined shooting-permitting area and starts up a photographing function, followed by entering a shooting standby state.

When the user presses the release button 13 for shooting, the controller 50 detects the brightness of an object by the image pickup element 37 and sets an aperture value and a shutter speed based on a photometric value obtained by the detection. Further, the controller 50 determines whether or not it is required to flash the strobe 18. The user can also operate the operation button 21 to thereby select in advance whether or not to forcibly flash the strobe 18.

Then, the controller 50 performs ranging to measure a distance to the object, and controls the focus motor drive section 31 to move a focus lens unit 30 to a predetermined focus position. The focus lens unit 30 is comprised of a photographic lens unit 1, a second lens unit 2, and a third lens unit 5, described hereinafter. Further, the controller 50 controls the shutter drive section 32 to open a shutter 33, thereby causing a desired image to be picked up by the image pickup element 37. Electrical charge corresponding to the amount of light that enters the image pickup element 37 according to an exposure control value is accumulated in the image pickup element 37, and the electrical charge is converted into an image signal, followed by being output to an analog signal processing section 36.

The analog signal processing section 36 carries out analog signal processing on the received image signal and then outputs the processed image signal to an A/D converter section 38. The A/D converter section 38 converts the received analog data of the processed image signal to digital data. Then, the digital data is output to a digital signal processing section 39 to be processed therein. Finally, the digital data is stored in the memory 40.

When the operation button 22 is operated, the digital data stored in the memory 40 is subjected to compression processing and the like, such as JPEG compression or TIFF compression, by a compressing/expanding section 41. Then, the compressed digital data is output to the memory card drive 42 and is stored in the memory card as well as in the memory 40. It should be noted that when the digital camera 12 is not provided with the memory 40, digital data processed by the digital signal processing section 39 is output to the compressing/expanding section 41 to be stored in the memory card by the memory card drive 42.

The controller 50 causes the compressing/expanding section 41 to perform expansion processing on the image data stored in the memory 40 or the image data stored in the memory card by the memory card drive 42, and causes the display 20 to display the processed image data via the bus 44. When viewing the image data displayed on the display 20 and determining that the image is unnecessary, the user can operate the operation button 23 to erase the same.

When the user operates the zoom switch 14 provided on the top surface of the digital camera 12, the zoom motor drive section 29 is controlled by the controller 50 via the driving circuit 43 to move the photographic lens barrel 71 along the optical axis of the lens (i.e. in a direction of the optical axis passing through the center of the lens). The user can operate the zoom switch 14 to enlarge or reduce the image on the display 20, i.e. to perform a so-called digital zoom operation.

Figure 7:
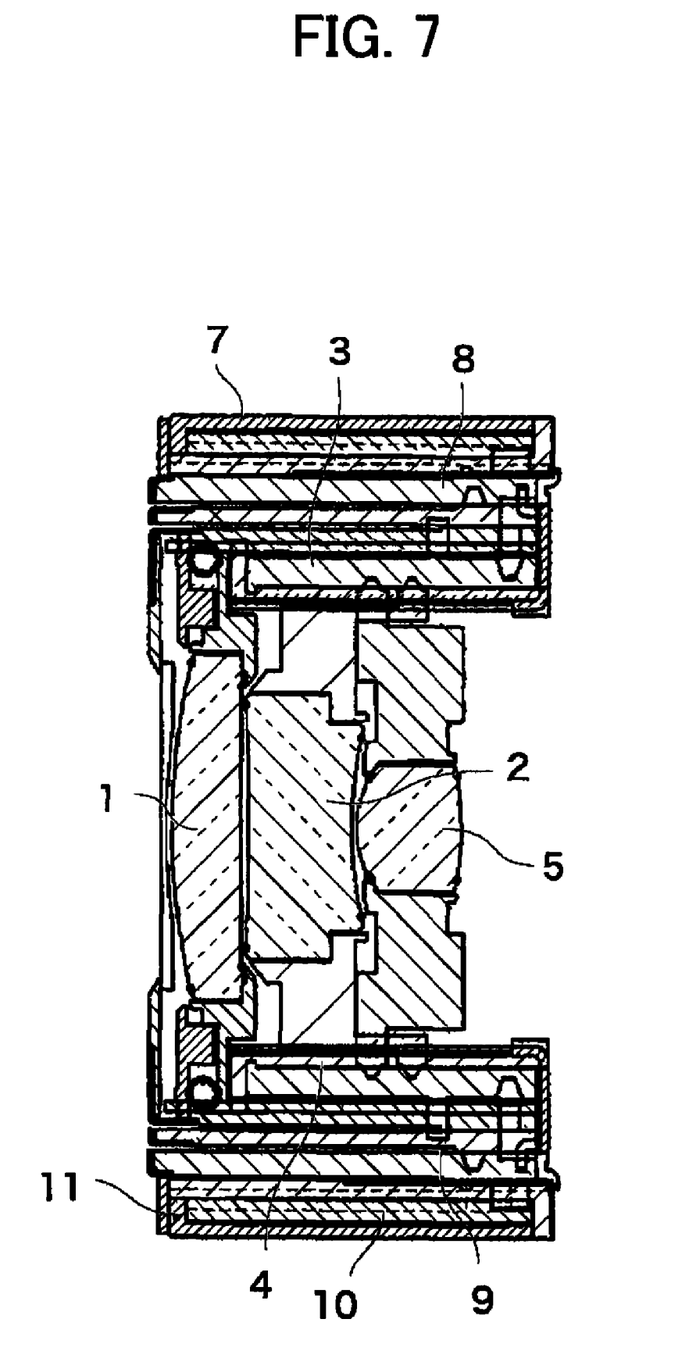
FIG. 7 is a cross-sectional view showing the internal construction of a photographic lens barrel in a retracted state.
Figure 8:
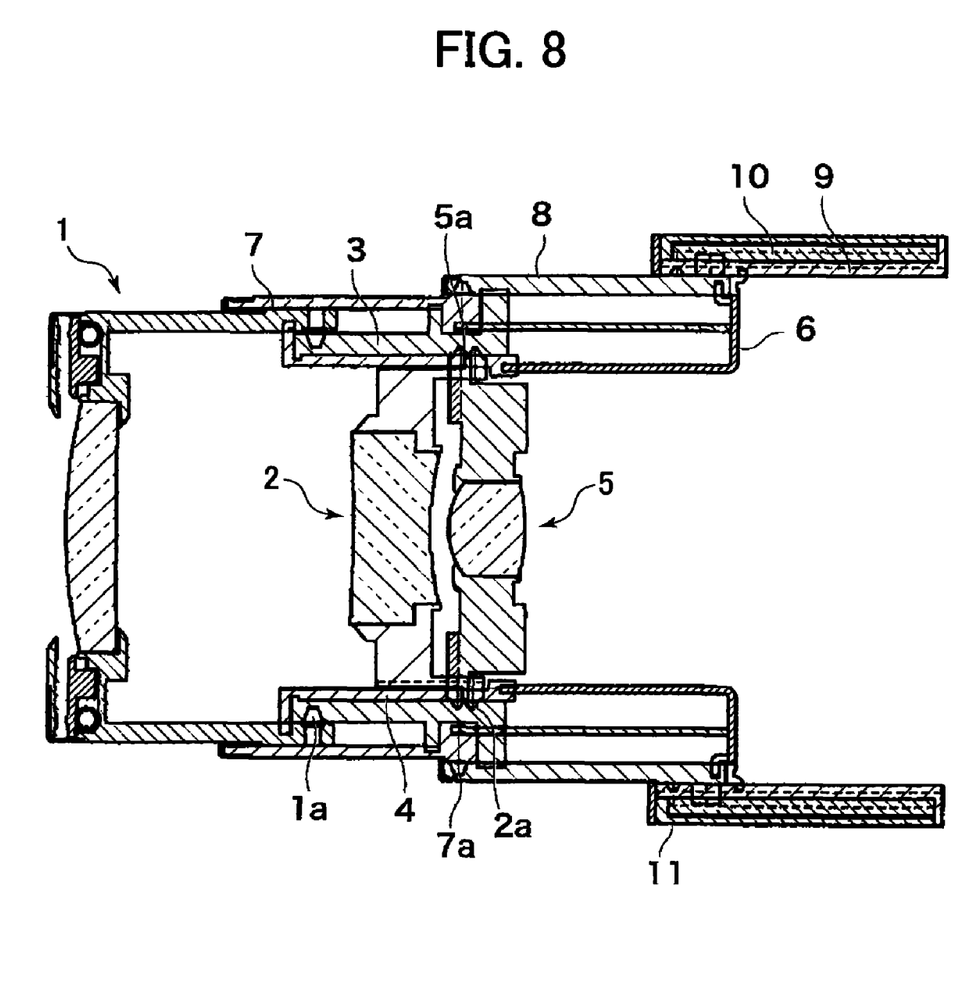
FIG. 8 is a cross-sectional view showing the internal construction of the photographic lens barrel in a shooting-ready state.
Figure 9:
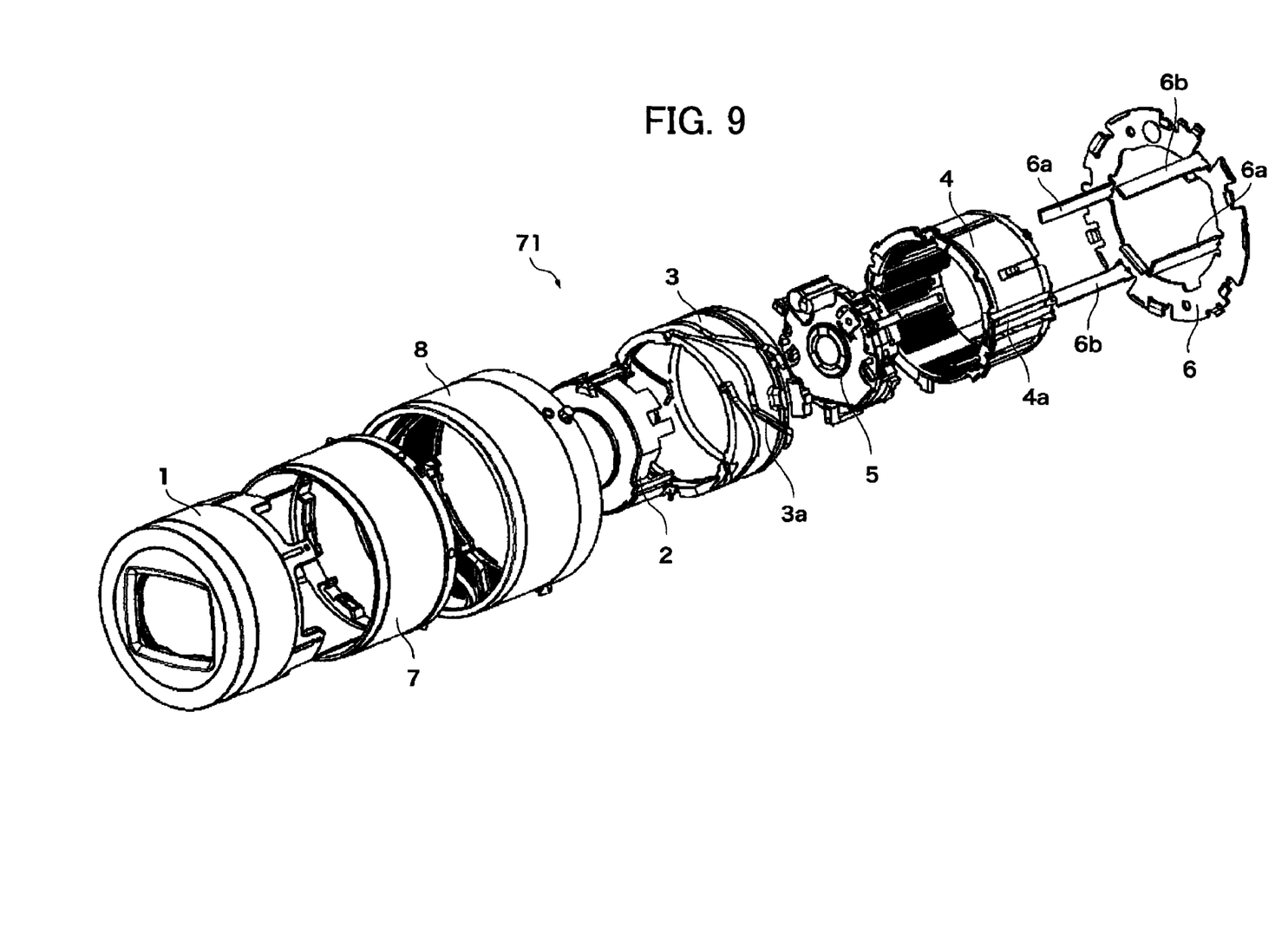
FIG. 9 is an exploded perspective view of the photographic lens barrel.

Next, a description will be given of the construction of a lens group provided in the photographic lens barrel of the digital camera 12. FIG. 7 is a cross-sectional view showing the internal construction of the photographic lens barrel 71 in a retracted state. FIG. 8 is a cross-sectional view showing the internal construction of the photographic lens barrel 71 in a shooting-ready state. FIG. 9 is an exploded perspective view of the photographic lens barrel 71.

The photographic lens unit 1 is formed by a cylindrical housing having an optical lens fitted therein. The photographic lens unit 1 is formed with pin-shaped followers 1a. The followers 1a are formed at respective six locations spaced at angular intervals of 60° in the circumferential direction with respect to the optical axis. The second lens unit 2 is formed by a holder having another optical lens fitted therein.

The second lens unit 2 is also integrally formed with pin-shaped followers 2a. The pin-shaped followers 2a are formed at respective three locations spaced at angular intervals of 120° in the circumferential direction with respect to the optical axis. Similarly, the third lens unit 5 is formed by a holder having another optical lens fitted therein. The third lens unit 5 is also integrally formed with three pin-shaped followers 5a.

In the outer periphery of a cylindrical unit 3, there are formed first cam grooves (cam portions) 3a followed by the respective followers 1a. Second cam grooves (not shown) are formed in the inner periphery of the cylindrical unit 3 at three circumferential locations on, for causing the respective followers 2a to move in a manner following the same. Similarly, third cam grooves (not shown) are formed in the inner periphery of the cylindrical unit 3 at three circumferential locations, for causing the respective followers 5a to move in a manner following the same.

Further, a rectilinear motion-causing restriction member 4 is engaged with the cylindrical unit 3. The cylindrical unit 3 and the rectilinear motion-causing restriction member 4 are bayonet-coupled to each other, and the cylindrical unit 3 rotates circumferentially along the outer periphery of the rectilinear motion-causing restriction member 4. The photographic lens unit 1 moves along the optical axis with its motion restricted to rectilinear motion by the rectilinear motion-causing restriction member 4. Each of the second lens unit 2 and the third lens unit 5 also has its motion restricted to rectilinear motion by the rectilinear motion-causing restriction member 4.

A second cylindrical unit 7 is fitted on the outer periphery of the photographic lens unit 1. The second cylindrical unit 7 and the cylindrical unit 3 are bayonet-coupled to each other. The second cylindrical unit 7 and the cylindrical unit 3 are movable substantially in unison in the optical axis direction (front-rear direction).

Further, the second cylindrical unit 7 is formed with followers 7a, and the followers 7a follow cam grooves (not shown) formed in the inner periphery of a third cylindrical unit 8. The third cylindrical unit 8 is movable along the optical axis by cam grooves (not shown) formed in the inner periphery of a fixed cam unit 9. The third cylindrical unit 8 directly receives a rotational force from a drive ring 10 fitted on the outer periphery of the fixed cam unit 9. The drive ring 10 is held by a cover member 11. The photographic lens unit 1, the second cylindrical unit 7, and the third cylindrical unit 8 can be retracted in the optical axis direction.

Figure 10:
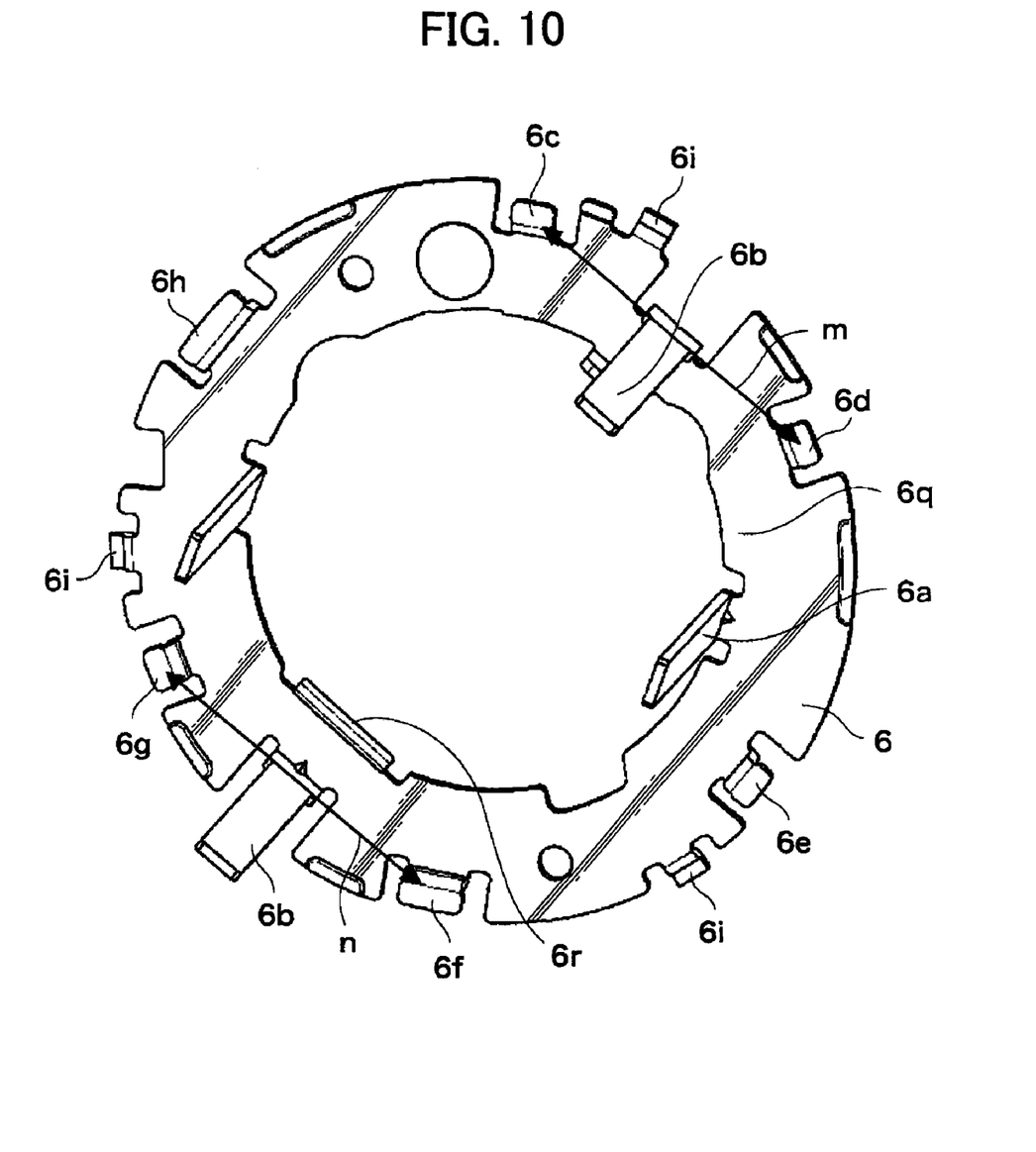
FIG. 10 is a perspective view of a second rectilinear motion-causing restriction member.
Figure 11:
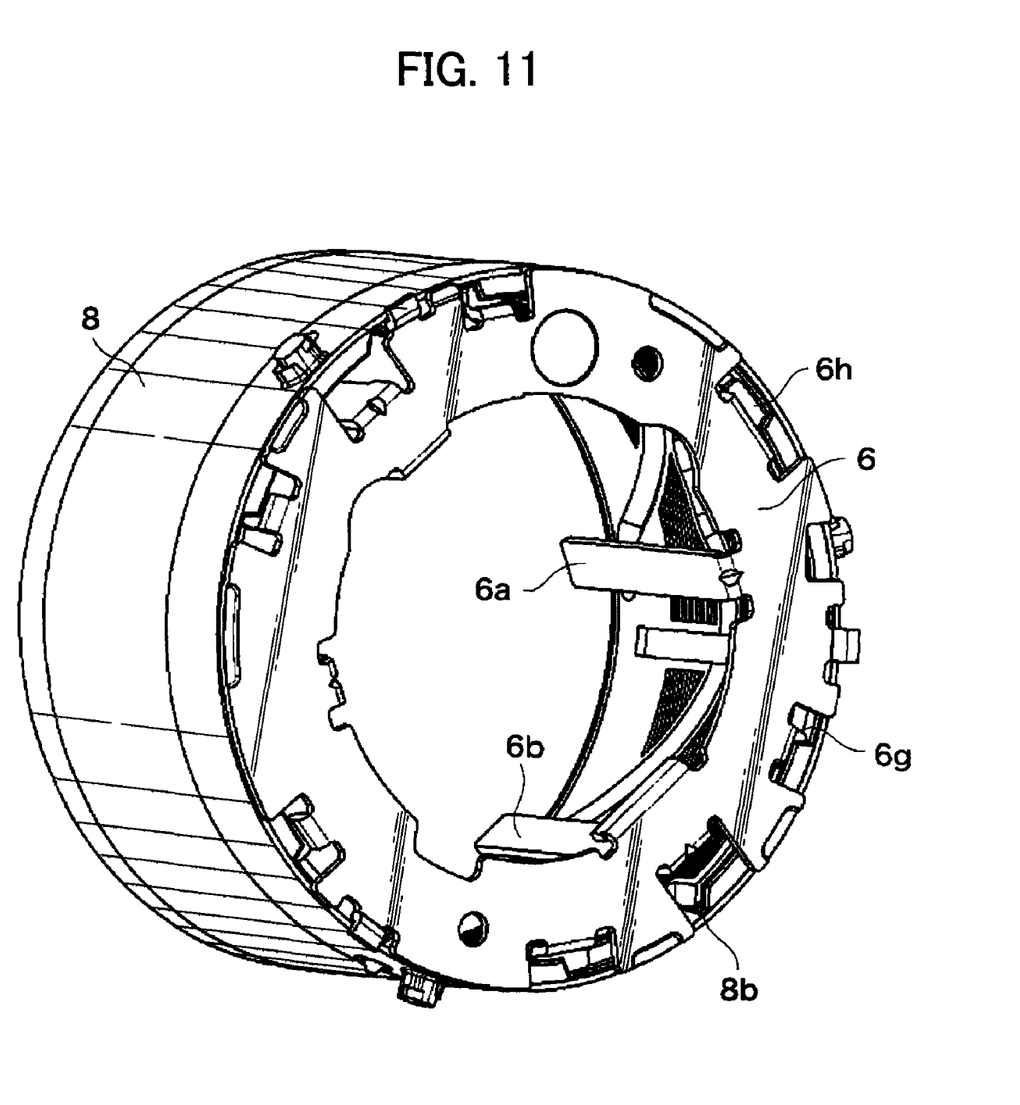
FIG. 11 is a perspective view of a third cylindrical unit.
Figure 12:
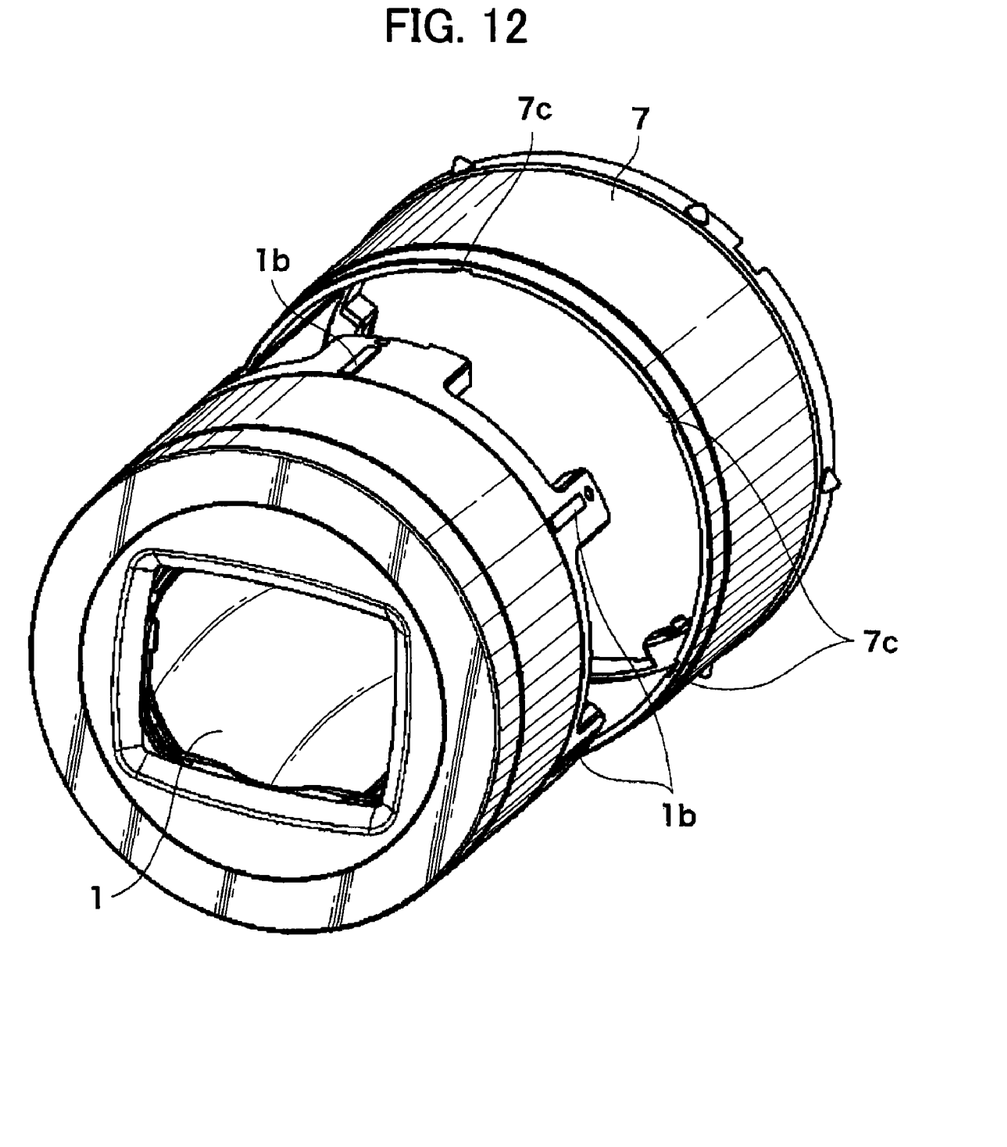
FIG. 12 is a perspective view of a state where a photographic lens unit has been fitted in a second cylindrical unit.
Figure 13:
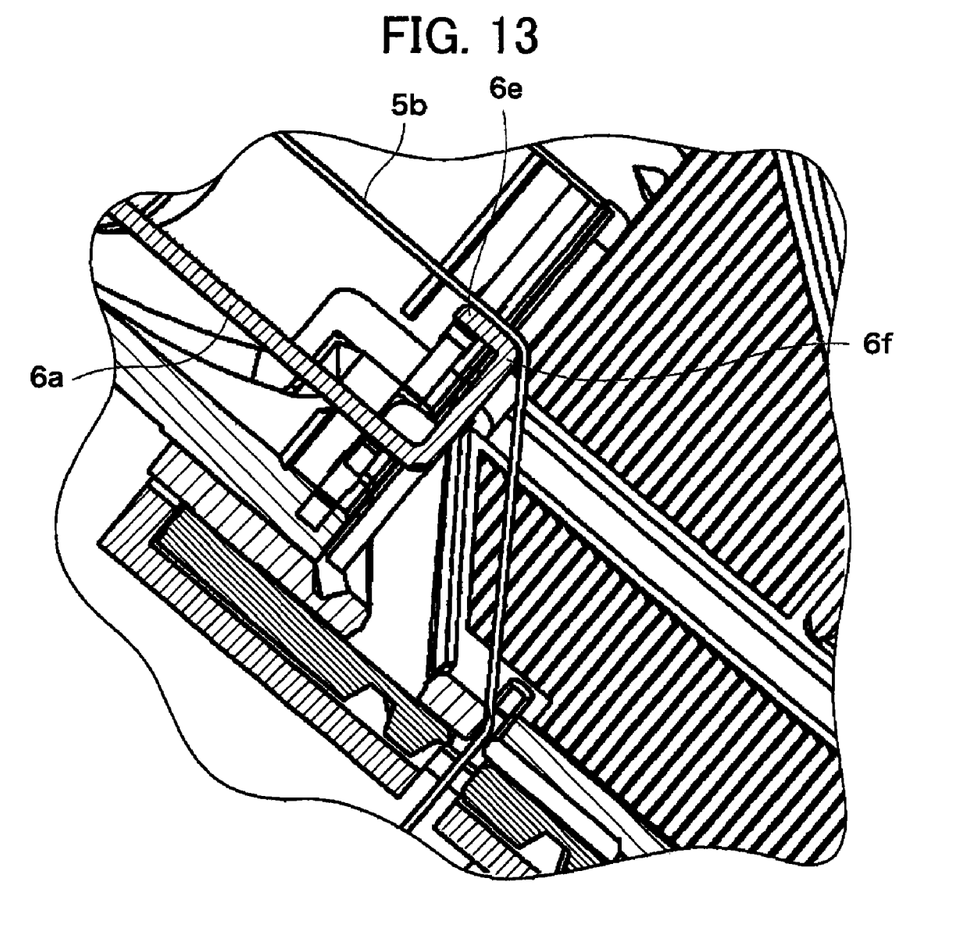
FIG. 13 is a cross-sectional view of the photographic lens barrel.

FIG. 10 is a perspective view of a second rectilinear motion-causing restriction member 6. FIG. 11 is a perspective view of the third cylindrical unit 8. FIG. 12 is a perspective view of a state where the photographic lens unit 1 has been fitted in the second cylindrical unit 7. FIG. 13 is a cross-sectional view of the photographic lens barrel.

The second rectilinear motion-causing restriction member 6 is comprised of an annular portion 6q, and two rectilinear motion-causing restriction portions 6a and two rectilinear motion-causing restriction portions 6b each protruding from the annular portion 6q in the optical axis direction. Further, a rib 6r is formed at a location close to one of the rectilinear motion-causing restriction portions 6b in a manner protruding in a radial direction of the annular portion 6q. On the other hand, on the outer periphery of the rectilinear motion-causing restriction member 4, there are formed two restricted-to-rectilinear motion portions 4a, and each of the two rectilinear motion-causing restriction portions 6a is engaged with an associated one of the two restricted-to-rectilinear motion portions 4a of the rectilinear motion-causing restriction member 4, whereby the rectilinear motion-causing restriction member 4 is guided in the rectilinear direction. Further, on the inner periphery of the second cylindrical unit 7, there are formed two restricted-to-rectilinear motion portions, and each of the two rectilinear motion-causing restriction portions 6b is engaged with an associated one of the two restricted-to-rectilinear motion portions of the second cylindrical unit 7, whereby the second cylindrical unit 7 is guided in the rectilinear direction.

As shown in FIG. 11, the third cylindrical unit 8 is fitted in the second rectilinear motion-causing restriction member 6 such that bayonet portions (coupling portions) of the second rectilinear motion-causing restriction member 6 are fitted in respective grooves of to-be-bayonetted portions 8b. This causes the third cylindrical unit 8 and the second rectilinear motion-causing restriction member 6 to move in unison forward and rearward in the optical axis direction, with the third cylindrical unit 8 rotatably held.

Rectilinear slide keys 6i formed on the second rectilinear motion-causing restriction member 6 are engaged with respective rectilinear guides (not shown), whereby rotation of the second rectilinear motion-causing restriction member 6 is restricted.

The cylindrical part 3 has protrusions, not shown, formed thereon, and these protrusions are engaged with grooves, not shown, formed in the inner peripheral surface of the third cylindrical part 8. When the drive ring 10 is rotated by the zoom motor drive section 29 via gears, not shown, in a barrel retracted state (see FIG. 1), the third cylindrical unit 8 performs rotation, which causes rotation of the cylindrical unit 3. As a consequence, the photographic lens unit 1, the second photographic lens unit 2, and the third photographic lens unit 5 move in the optical axis direction. At this time, the second rectilinear motion-causing restriction member 6, the rectilinear motion-causing restriction member 4, and the second cylindrical unit 7 do not rotate. It should be noted that since the cylindrical unit 3 is bayonet-coupled to the rectilinear motion-causing restriction member 4 and the second cylindrical unit 7, these move in the optical axis direction in unison. After the component elements move, the digital camera enters the shooting-ready state (see FIG. 2).

By the way, a small-sized consumer apparatus, such as a digital camera, can be dropped or bumped against something due to slightest carelessness of a user. Therefore, a digital camera is required to have a certain degree of strength resistant to an impact caused by such an accident.

Assuming that the photographic lens unit 1 is at rest at a location where the cam portions 3a formed on the cylindrical unit 3 extend substantially linearly in the optical axis direction, i.e. at such a location where the extending speed of the lens barrel is high, if an impact is applied to the photographic lens unit 1 in this state, the impact force is transmitted to the cam portions 3a via the followers 1a. The impact force transmitted to the cam portion 3a gives a rotational force to the cylindrical unit 3. However, the cylindrical unit 3, which is locked by the zoom motor drive section 29, does not rotate. For this reason, the photographic lens unit 1 receives the rotational force to the contrary. The rotational force of the photographic lens unit 1 is transmitted to the rectilinear motion-causing restriction member 4, and then to the rectilinear motion-causing restriction portions 6a formed on the second rectilinear motion-causing restriction member 6.

As shown in FIGS. 12 and 13, the photographic lens unit 1 has six of the third rectilinear motion-causing restriction portions 1b formed in the same phase as the followers 1a, respectively. Further, the second cylindrical unit 7 is formed with third restricted-to-rectilinear motion portions 7c each having a long groove shape. In a normal operating state, the third rectilinear motion-causing restriction portions 1b are in non-contact with the third restricted-to-rectilinear motion portions 7c. When an impact is applied to the photographic lens unit 1, if the second rectilinear motion-causing restriction member 6 and the like are elastically deformed to cause rotation of the photographic lens unit 1, the third rectilinear motion-causing restriction portions 1b are brought into contact with the third restricted-to-rectilinear motion portions 7c, whereby the second cylindrical unit 7 receives a rotational force from the photographic lens unit 1. The rotational force is transmitted to the rectilinear motion-causing restriction portions 6b formed on the second rectilinear motion-causing restriction member 6.

With the above-described construction, an impact applied to the photographic lens unit 1 can be received not only by the rectilinear motion-causing restriction member 4 at a radially inner location, but also by the second cylindrical unit 7 at a radially outer location, which makes it possible to increase a margin of strength against destruction due to an impact.

Further, an impact is applied, an impact force is transmitted to the second rectilinear motion-causing restriction member 6 through any route, and therefore it is required to prevent deformation of all coupling portions receiving the impact force. To this end, the coupling portions (the aforementioned bayonet portions) 6c, 6d, 6e, 6f, 6g, and 6h are formed, as shown in FIG. 10, such that two coupling portions are located at the respective opposite sides of each of the rectilinear motion-causing restriction portions 6a and 6b, whereby resistance against deformation is increased. In short, the coupling portions 6c, 6d, 6e, 6f, 6g, and 6h serve as deformation-preventive holding portions for the rectilinear motion-causing restriction portions 6a and 6b.

Further, the third cylindrical unit 8 has a rear part (re2ar end) thereof formed with the groove-shaped to-be-bayonetted portions 8b, as shown in FIG. 11, and the coupling portions 6c, 6d, 6e, 6f, 6g, and 6h are integrated into the to-be-bayonetted portions 8b by bayonet engagement. Thus, the third cylindrical unit 8 and the second rectilinear motion-causing restriction member 6 can move substantially in unison in the optical axis direction, while being capable of rotation.

As shown in FIG. 10, deformation of the rectilinear motion-causing restriction portions 6a is prevented basically by the coupling portions 6d and 6e as a set and the coupling portions 6g and 6h as a set. On the other hand, deformation of the rectilinear motion-causing restriction portions 6b is prevented basically by the coupling portions 6c and 6d as a set and the coupling portions 6f and 6g as a set. Thus, the coupling portions 6d, 6e, 6g, 6h, 6c, 6d, 6f, and 6g serve as deformation-preventive holding portions as well.

It is possible to obtain the effect of preventing deformation of each rectilinear motion-causing restriction portion simply by forming coupling portions at the respective opposite sides of the rectilinear motion-causing restriction portion. However, when the annular portion 6q of the second rectilinear motion-causing restriction member 6 is considered as a circle, resistance against deformation of the second rectilinear motion-causing restriction member 6 can be increased by positioning a pair (set) of coupling portions on a tangent line (i.e. in a tangent direction) of each of the rectilinear motion-causing restriction portions 6b. For example, the coupling portions 6c and 6d as a set are positioned on a tangent line m of one of the rectilinear motion-causing restriction portions 6b. Similarly, the coupling portions 6f and 6g as a set are positioned on a tangent line n of the other rectilinear motion-causing restriction portions 6b.

In general, each rectilinear motion-causing restriction portion needs two coupling portions, and therefore in the present embodiment, since the four rectilinear motion-causing restriction portions exist, it is considered that a total of eight coupling portions are necessitated. However, the coupling portion 6d, which is adjacent to both one of the rectilinear motion-causing restriction portions 6a and one of the rectilinear motion-causing restriction portions 6b, can hold the two rectilinear motion-causing restriction portions at the same time. This also applies to the coupling portion 6g. The above-described construction makes it possible to reduce space on the annular portion 6q (peripheral surface) of the second rectilinear motion-causing restriction member 6, where coupling portions are provided, thereby achieving space saving and enhancing the degree of freedom in layout.

Figure 14:
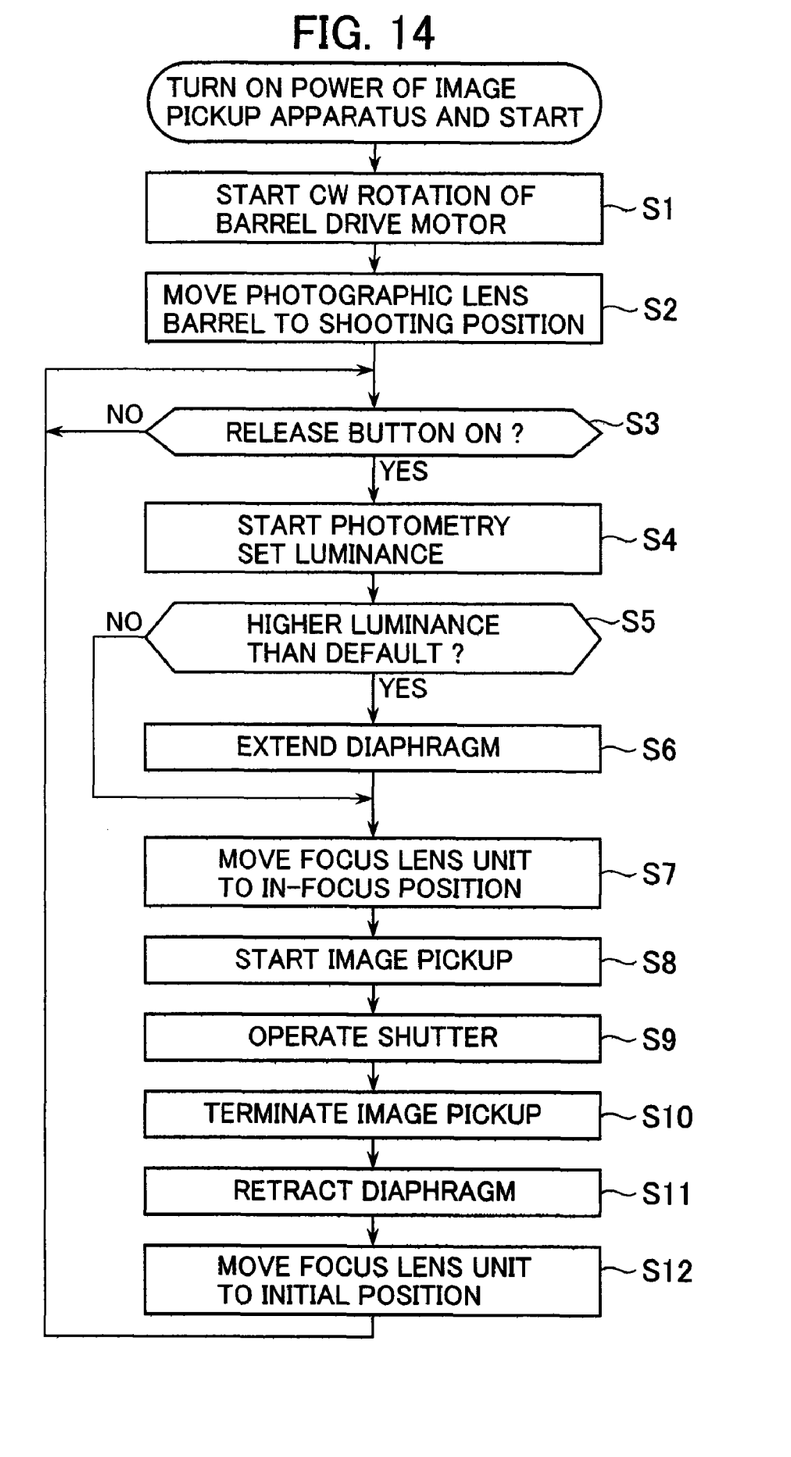
FIG. 14 is a flowchart of a process of operation of the digital camera provided with the photographic lens barrel, from power-on to termination of shooting.

FIG. 14 is a flowchart of a process of operation of the digital camera provided with the photographic lens barrel 71, from power-on to termination of shooting. A control program for this process stored in the ROM 45 of the controller 50, and is read out for execution by the CPU 46.

When the user turns on the power of the digital camera 12, the CPU 46 gives an instruction to the zoom motor drive section 29 to cause CW (clockwise) rotation of the barrel drive motor 29a (step S1). Then, the CPU 46 causes a predetermined operation to be performed, and after confirming that the photographic lens barrel 71 has been moved to an image-taking position, causes the zoom motor drive section 29 to stop the barrel drive motor 29a. As a consequence, the photographic lens barrel changes from the FIG. 1 state to the FIG. 2 state.

Then, the CPU 46 waits for the user to turn on the release button 13 (step S3). When the release button 13 is turned on, the CPU 46 performs photometry to thereby obtain luminance information on an object (step S4).

The CPU 46 determines whether or not the obtained luminance information indicates a higher luminance than a default luminance (step S5). If the obtained luminance information indicates a higher luminance than the default luminance, the CPU 46 causes a diaphragm 34 to extend into the optical path to change the amount of incident light (step S6).

On the other hand, if the obtained luminance information indicates a lower luminance than the default luminance, the CPU 46 holds the diaphragm aperture 34 in a state retracted from the optical path without carrying out an operation for extending the diaphragm 34 into the optical path, and proceeds to processing in a step S7.

Thereafter, the CPU 46 operates the focus lens unit 30 to move the same to a position where the object is in focus (step S7), and starts an image pickup operation in the position (step S8). Then, the CPU 46 switches the shutter 33 from its open state to its closed state to block incident light (step S9), followed by terminating the image pickup operation (step S10).

Thereafter, the CPU 46 causes the diaphragm 34 to retract from the optical path (step S11) and moves the focus lens unit 30 to its initial position (step S12). Then, the CPU 46 returns to the step S3 and repeatedly carries out the same processing described above until the power is turned off.

According to the photographic lens barrel of the present embodiment, when the motion of the lens barrel is to be restricted to rectilinear motion using the rectilinear slide keys (the rectilinear motion-causing restriction portions 6a and the rectilinear motion-causing restriction portions 6b) in a space saving manner, an impact applied to the leading end of the lens barrel is received not only by the rectilinear motion-causing restriction member 4 at a radially inner location, but also by the second cylindrical unit 7 at a radially outer location, which makes it possible to reduce the risk of destruction due to impact. Further, the bayonet-shaped coupling portions also serving as deformation-preventive holding portions are formed in the vicinity of each of the rectilinear slide keys, whereby it is possible to prevent deformation of the rectilinear slide keys to some extent.

The present invention is not limited to the above described embodiment, but can be modified in various manners based on the subject matter of the present invention, which should not be excluded from within the scope of the present invention insofar as functions as recited in the appended claims or the functions performed by the construction of the above described embodiment can be achieved.

For example, although in the above described embodiment, the compact-type digital camera is described by way of example, this is not limitative, but the present invention can also be applied to a film camera, a digital video camera, a digital SLR (single-lens reflex camera), and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-061148 filed Mar. 11, 2008, which is hereby incorporated by reference herein in its entirety.

What is claimed is:

1. A lens barrel that is movable in an optical axis direction, comprising:
   a lens unit configured to be movable in the optical axis direction while holding a lens, said lens unit comprising a follower portion and a first rectilinear motion-causing restriction portion;
   a cylindrical unit having a cam portion for causing said follower portion of said lens unit to follow said cam portion, said cylindrical unit being configured to perform rotation to thereby move said lens unit in the optical axis direction;
   a rectilinear motion-causing restriction member configured to restrict motion of said lens unit to the optical axis direction;
   a second cylindrical unit bayonet-coupled to said cylindrical unit, said second cylindrical unit having its rotation around the optical axis restricted so as not to rotate around the optical axis even if said cylindrical unit bayonet-coupled thereto rotates around the optical axis,
   wherein said second cylindrical unit has a second rectilinear motion-causing restriction portion, wherein when said lens unit rotates around the optical axis, said first rectilinear motion-causing restriction portion of said lens unit and said second rectilinear motion-causing restriction portion are shifted from a non-contact state thereof to a contact state thereof.

2. An image pickup apparatus comprising a lens barrel according to claim 1.

3. The lens barrel according to claim 1 further comprising a second rectilinear motion-causing restriction unit configured to restrict said rectilinear motion-causing restriction member and said second cylindrical unit to rotate around the optical axis.

4. The lens barrel according to claim 3, comprising a third cylindrical unit disposed on an outer periphery of said second cylindrical unit and configured to move said cylindrical unit and said second cylindrical unit in the optical axis direction, and wherein said second rectilinear motion-causing restriction member comprises an annular portion, a plurality of third rectilinear motion-causing restriction portions protruding from said annular portion in the optical axis direction and engaged with said rectilinear motion-causing restriction member and said second cylindrical unit to thereby restrict the motion of said rectilinear motion-causing restriction member and said second cylindrical unit to the rectilinear motion, and coupling portions formed on said annular portion on respective opposite sides of each of said third rectilinear motion-causing restriction portions to be thereby rotatably coupled to said third cylindrical unit.

5. The lens barrel according to claim 4, wherein said second rectilinear motion-causing restriction member comprises deformation-preventive holding portions formed on said annular portion on respective opposite sides of each of said third rectilinear motion-causing restriction portions, in a tangent direction, to thereby preventing said third rectilinear motion-causing restriction portions from being deformed.

6. The lens barrel according to claim 5, wherein each of said deformation-preventive holding portions holds said third rectilinear motion-causing restriction portions located on respective opposite sides thereof.

7. The lens barrel according to claim 5, wherein said coupling portions also serve as said deformation-preventive holding portions, and are bayonet-coupled to a rear end of said third cylindrical unit.

* * * * *